US011242184B2

(12) United States Patent
Valentini

(10) Patent No.: US 11,242,184 B2
(45) Date of Patent: Feb. 8, 2022

(54) PACKAGE UNIT COMPRISING A PACKAGING AND A CIRCULAR PLATE-LIKE ACCESSORY FOR POWER TOOLS CONTAINED IN THE PACKAGING

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 0 days.

(21) Appl. No.: 17/242,630

(22) Filed: Apr. 28, 2021

(65) Prior Publication Data

US 2021/0387784 A1   Dec. 16, 2021

(30) Foreign Application Priority Data

Jun. 10, 2020   (EP) ..................................... 20179204

(51) Int. Cl.
| | | |
|---|---|---|
| *B65D 81/24* | (2006.01) | |
| *B65D 75/26* | (2006.01) | |
| *B65D 75/58* | (2006.01) | |
| *B65D 81/18* | (2006.01) | |
| *B65D 75/52* | (2006.01) | |
| *B32B 15/09* | (2006.01) | |
| *B32B 15/20* | (2006.01) | |
| *B32B 27/32* | (2006.01) | |
| *B32B 27/36* | (2006.01) | |
| *B32B 1/00* | (2006.01) | |
| *B32B 15/085* | (2006.01) | |

(52) U.S. Cl.
CPC ................ *B65D 75/26* (2013.01); *B32B 1/00* (2013.01); *B32B 15/085* (2013.01); *B32B 15/09* (2013.01); *B32B 15/20* (2013.01); *B32B 27/32* (2013.01); *B32B 27/36* (2013.01); *B65D 75/522* (2013.01); *B65D 75/5827* (2013.01); *B65D 81/18* (2013.01); *B32B 2307/5825* (2013.01); *B32B 2439/46* (2013.01)

(58) Field of Classification Search
CPC .. B65D 75/26; B65D 75/522; B65D 75/5827; B65D 81/18
USPC .... 206/207, 349, 461, 466, 471, 459.5, 521, 206/522, 591, 776–778; 383/106, 107
See application file for complete search history.

(56) References Cited

U.S. PATENT DOCUMENTS

| | | | | |
|---|---|---|---|---|
| 2,757,791 | A | * | 8/1956 | Kendig .................. B65D 77/26 206/292 |
| 3,445,324 | A | * | 5/1969 | Curler ..................... B32B 27/00 428/216 |

(Continued)

FOREIGN PATENT DOCUMENTS

| | | |
|---|---|---|
| EP | 1 086 905 A2 | 3/2001 |
| GB | 2 286 575 A | 8/1995 |
| WO | 90/11946 A1 | 10/1990 |

OTHER PUBLICATIONS

English Abstract of EP1086905.

*Primary Examiner* — Luan K Bui
(74) *Attorney, Agent, or Firm* — Ware, Fressola, Maguire & Barber LLP

(57) ABSTRACT

The invention refers to a package unit (22) comprising a packaging (20) and at least one polishing pad (2), sanding pad, backing or supporting plate or similar circular plate-like accessory for power tools, in particular hand-guided polishers or sanders, contained in the packaging (20). It is suggested that the packaging (20) is a flow pack containing only a single polishing pad (2), sanding pad, backing or supporting plate or similar circular plate-like accessory for power tools.

10 Claims, 3 Drawing Sheets

(56) References Cited

U.S. PATENT DOCUMENTS

| | | | | |
|---|---|---|---|---|
| 3,802,024 | A * | 4/1974 | Fenster | A47L 13/16 |
| | | | | 15/258 |
| 5,366,777 | A * | 11/1994 | Bown | A47F 5/0006 |
| | | | | 206/466 |
| 5,620,095 | A * | 4/1997 | Delmore | A61F 15/001 |
| | | | | 206/438 |
| 8,091,705 | B1 * | 1/2012 | McCutchen | B65D 5/5061 |
| | | | | 206/486 |
| 10,874,561 | B1 * | 12/2020 | Murphy | A61L 15/12 |
| 2007/0000214 | A1 | 1/2007 | Schwabel et al. | |
| 2011/0155593 | A1 | 6/2011 | Zhang et al. | |
| 2021/0000997 | A1 * | 1/2021 | Mobley | A61L 9/042 |

* cited by examiner

PACKAGE UNIT COMPRISING A PACKAGING AND A CIRCULAR PLATE-LIKE ACCESSORY FOR POWER TOOLS CONTAINED IN THE PACKAGING

BACKGROUND OF THE INVENTION

1. Field of Invention

The present invention refers to a package unit comprising a packaging and at least one polishing pad, sanding pad, backing or supporting plate or similar circular plate-like accessory for power tools, in particular for hand-guided polishers and sanders, contained in the packaging.

2. Brief Description of Related Art

In the context of trade and production, the term packaging refers to the packaging of goods (objects or products) and is defined as the wrapping or covering of the goods. Packaging (also called "Emballage" in the commercial language) is the purposefully attached wrapping of a product, preferably during the transport of the product from the manufacturer to the end customer and when offered for sale at the reseller, dealer or distributor. The packaging can usually be removed again without much effort, preferably by the end customer. The wrapping can be partial (surrounding only part of the product) or complete (surrounding the entire product). A distinction is made between the direct packaging of a product, also referred to as the primary packaging, and the outer packaging or collective packaging, which is also referred to as secondary packaging. Unless otherwise mentioned, in the context of the present invention, the term 'packaging' refers to a primary packaging.

The product or object to be packed is called packaged good ("Packgut" in German), the readily packed good, i.e. the good including its packaging, is called the package or the package unit ("Packstuck" in German). Several package units of the same packaged goods form a collective package unit. The term package can be a synonym for packaging as well as for the entirety of packaged goods with packaging. Therefore, in the context of the present invention, the term 'package unit' is used for the entirety of packaged good(s) with packaging.

Circular plate-like accessories for hand guided power tools are, for example, polishing pads, sanding pads, backing or support plates for polishers or sanders. Backing or supporting plates are made of a rigid material, preferably plastic and/or metal, and have an attachment element on their top surface which allows releasable attachment of the backing or supporting plate to a drive shaft of a power tool, in particular a polisher or a sander. Once attached to the drive shaft and once the power tool is actuated, —depending on the type of power tool—the backing or support plates perform a purely rotational, a random orbital or a roto-orbital (gear-driven) working movement. Polishing pads are made of foam, or comprise wool, felt, microfiber or any other soft material on their bottom surface, which is adapted for polishing a vehicle, boat or aircraft body. Sanding pads comprise an abrasive material on their bottom surface for sanding wood, metal, plastic, varnish, lacquer, putty or body filler, or any other material. The polishing pads as well as the sanding pads usually have a layer of a hook-and-loop fastener attached to their top surface, adapted for releasable connection to the bottom surface of a backing or support plate. Another layer of a hook-and-loop fastener is attached to the bottom surface of the backing or support plate.

Furthermore, polishing and sanding plates are known in the art as circular plate-like accessories for hand guided power tools. Polishing and sanding plates combine a backing or supporting plate with a polishing or sanding pad, respectively, attached to the backing or supporting plate in a single entity. Polishing and sanding plates comprise a top layer made of a rigid material, preferably plastic and/or metal, and an attachment element on the top surface of the top layer which allows releasable attachment of the polishing or sanding plate to a drive shaft of a power tool, in particular a polisher or a sander. Fixedly attached to the top layer is a bottom layer functionally corresponding to the above-mentioned polishing or sanding pad. Other circular plate-like accessories may be, for example, buffing wheels.

It is known to pack circular plate-like accessories for hand guided power tools in tubular or rectangular plastic or cardboard boxes. While a plurality of polishing pads or sanding pads are usually bundled and packed together in a cardboard box or a tubular transparent rigid plastic packaging, backing or support plates are usually packed in rigid plastic boxes. The plastic boxes may have a rectangular base portion and a circular recessed portion for receiving the backing or support pad.

The disadvantage of the known packaging for circular plate-like accessories for hand guided power tools is that they are exposed to external influences such as UV-radiation, humidity, dust and debris (if the packaging has holes or cannot be tightly closed), or chemicals, in particular acid or lye. This may cause a degradation of the materials which the accessories are made of, in particular due UV-radiation, humidity or chemicals coming into contact with or affecting the accessories. Further, the external appearance of the accessories may suffer due to discoloring, in particular due to UV-radiation and the deposition of dust and debris. Finally, the accessories are not securely protected from external forces which may act on the packaging and the accessories stored therein, for example during storage and transport of the package unit. This may lead to permanent deformation of the packaging and/or the accessories, in particular if high temperatures and/or humidity are involved. For example, it is not at all unusual that during transport of the package units, temperatures of 50° C. to 80° C. are measured inside the cargo area of trucks, trains or ships.

SUMMARY OF THE INVENTION

Therefore, it is an object of the present invention to provide for a packaging of circular plate-like accessories for hand guided power tools, which overcomes the above drawbacks.

In order to solve this object, a package unit is disclosed having the features as follows: In particular, starting from the package unit of the above-mentioned kind, it is suggested that the packaging is a flow pack containing only a single polishing pad, sanding pad, backing or supporting plate or similar circular plate-like accessory for power tools.

The package unit according to the present invention comprises a packaging in the form of a flow pack. Flow packs as such are mainly known for packing food products, for example potato crisps or other snack articles. The inventor has realized that flow packs provide significant advantages if they are used as packaging for circular plate-like accessories for hand-guided power tools, in particular polishers and sanders. The use of flow packs in the field of power tool accessories is something completely novel and even revolutionary. Due to the rather raw and rough environment with regard to use and users of power tools, in the past only cheap and not very practical packaging has been used for circular plate-like accessories of power tools. In contrast thereto, the packaging suggested by the present invention is highly optimized and has numerous advantages.

First of all, the material used for the flow packs is rather inexpensive, very light-weight, can be easily handled and recycled by 100% or disposed of in an environmentally friendly manner. The empty flow packs can be folded together very small. Further, the circular plate-like accessories of power tools can be packed in the flow packs in a fast, cost-efficient and fully automated manner, e.g. by means of a fully automated packing machine, in particular a so-called flow wrapping machine. The production of the flow packs and the process of packaging the accessories can be performed by a single machine or by separate machines. The starting point is a tubular web of material, which is either rolled up on a roll or folded into a stack or pile in web form. The tubular material is taken from the roll or pile and the product is inserted therein through an opening at the front of the opened tubular material. The tubular material is then sealed at the front side and the opposite back side, i.e. behind the accessory packed inside the tubular material, so that the product is packed in a tubular bag in an airtight manner. Simultaneously with or after sealing the back side of the tubular material web, it can be cut to the desired length to form a single flow pack with the accessory packed therein.

According to a preferred embodiment of the present invention, it is suggested that the flow pack comprises a tubular bag whose opposite open sides are permanently sealed in an airtight manner after insertion of the polishing pad, sanding pad, backing or supporting plate or similar circular plate-like accessory for power tools into the bag. Preferably, the opposite open sides of the tubular bag are permanently sealed by means of heat sealing, gluing or welding. Of course, any other procedure for sealing the open sides of the tubular bag, which permit an airtight sealing of the tubular bag, can be used, too.

It is suggested that the material of the flow pack comprises at least one layer made of a plastic foil. Additionally or alternatively, it is suggested that the material of the flow pack comprises at least one layer made of a metal foil.

According to another preferred embodiment of the present invention, it is suggested that the material of the flow pack comprises a composite laminated material with at least two layers made of different materials, the layers inseparably laminated to each other. The layers may be made of or comprise plastic, metal and/or any other foil material. Preferably, at least one of the layers is made of metal, in particular aluminium. Most preferably, it is suggested that at least one of the layers is made of plastic, in particular polyethylene terephthalate (PET) or polyethylene (PE).

An external layer or an external surface of the flow pack may have a desired colour and/or may be provided with a desired imprinting. The imprint may be provided on the external layer or surface of the tubular material web before it is rolled up on a roll or stacked on a pile. The imprint may be provided by means of any known printing process, including but not limited to tampon printing, inkjet printing, and laser printing. The colour of the external layer or surface or of the imprint of the flow pack may be representative of the type of accessory contained in the respective packaging. For example, it is known that polishing pads are available in different colours (e.g. blue, green, yellow, white) each corresponding to a specific hardness (e.g. coarse, medium, fine, ultra-fine). The colour of the external layer or surface or of the imprint of the flow pack may be or may comprise, e.g. blue, green, yellow, white, depending on the hardness of the polishing pad contained therein.

It is further suggested that the flow pack has a transparent window that allows a view of the packaged polishing pad, sanding pad, backing or support plate or similar circular plate-like accessory for power tools. This has the advantage, that a potential client or user of the accessory can immediately see what kind of product is contained in the packaging. Preferably, the transparent window is provided with an UV-filter which blocks at least most if not all of the external UV-rays and protects the accessory inside the packaging therefrom.

In order to provide for a safe and secure protection of the accessory contained in the packaging, it is suggested that the material of the flow pack is tear-resistant. 'Tear resistance' in this context means that the material of the flow pack cannot be easily torn by a user with his bare hands. The material will withstand a user grabbing the material with his hands and trying to tear it apart. However, the flow pack may be opened by means of a pointed object, e.g. the tip of a knife or of a scissors, which may be stuck into the material for creating a hole starting from which the material may be torn open. Alternatively, the packaging could be opened by separating the layers of the packaging in the region of the sealing seams, i.e. by releasing the sealing seams. However, in that case not the material would be torn open but rather the sealing seams where the layers are sealed together at the front and the back sides of the flow back are broken up. The high tear resistance allows the realization of an air cushion damping effect without the danger of the flow pack bursting apart when pressed together by external force.

According to another preferred embodiment, it is suggested that the flow pack has two transverse airtight sealing seams at opposite sides of the flow pack and at least one tearing region positioned in at least one of the two transverse airtight sealing seams. It is suggested that the at least one tearing region comprises a perforation or a slit in the at least one of the two transverse airtight sealing seams. Preferably, the tearing region is entirely provided in the region of the transverse airtight sealing seams and does not extend beyond the sealing seams into that part of the material which covers the accessory contained in the flow pack. This assures a safe and reliable airtight encapsulation of the accessory.

Furthermore, it is suggested that the flow pack has a gas enclosed therein after opposite sides of the flow pack have been permanently sealed in an airtight manner. The enclosed gas has a larger volume than the accessory contained in the flow pack. Preferably, the volume of the gas enclosed in the flow pack is larger than half the maximum volume which the flow pack can contain. The gas may be ambient air which provides the polishing pad, sanding pad, backing or support plate or similar circular plate-like accessory for power tools with an air-cushion damping effect during transport and handling of the package unit.

Alternatively, the gas may be a specific packaging gas, which is introduced into the flow pack in order to flush ambient air out of the flow pack before permanently sealing opposite sides of the flow pack in an airtight manner and in order to protect the integrity of the packaged polishing pad, sanding pad, backing or support plate or similar circular plate-like accessory for power tools. A packaging gas is used to pack sensitive goods in a modified atmosphere environment. The gas used is usually inert, or of any other nature that protects the integrity of the packaged goods, inhibiting unwanted chemical reactions such as chemical reactions, in particular oxidation. The packing gas may in particular comprise one or more of the following gases:

argon (E938),
helium (E939),
nitrogen (E941), and
carbon dioxide (E290).

It may be particularly advantageous if the packaging gas is a $CO_2$-nitrogen mixture. By introducing the packaging gas into the flow pack before sealing it the ambient air with oxygen is flushed out. A protective atmosphere prevails inside the packaging due to the packaging gas it contains.

BRIEF DESCRIPTION OF THE DRAWING

Further features and advantages of the present invention will become apparent from the following detailed description of the invention, which refers to the accompanying figures. It is emphasized that each of the features shown in the figures may be important for the present invention on its own, even if not explicitly mentioned in the below description. Furthermore, any combination of the shown features may be important for the present invention on its own, even if that specific combination of features is not explicitly mentioned in the below description. The figures show.

DETAILED DESCRIPTION OF THE BEST MODE OF THE INVENTION

Figure 4:
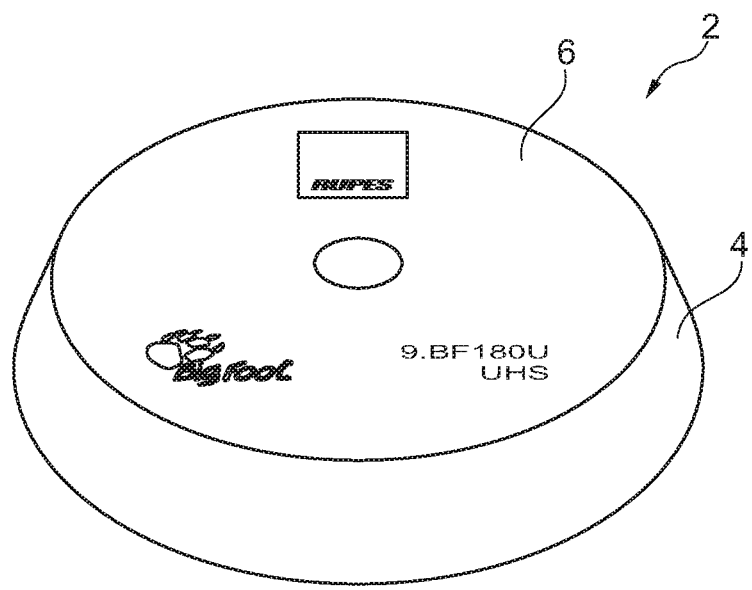
FIG. 4 a polishing pad of a package unit according to an embodiment of the present invention in a perspective view.

The present invention refers to the packaging of circular plate-like accessories for hand guided power tools, in particular for hand-guided polishers or sanders. These accessories are, for example, polishing pads 2 (see FIG. 4), sanding pads, backing or support plates for polishers or sanders. Backing or supporting plates are made of a rigid material, preferably plastic and/or metal, and have an attachment element on their top surface which allows releasable attachment of the backing or supporting plate to a drive shaft of a power tool, in particular a polisher or a sander. Once attached to the drive shaft and once the power tool is actuated, —depending on the type of power tool—the backing or support plates perform a purely rotational, a random orbital or a roto-orbital (gear-driven) working movement.

Polishing pads 2 are made of foam 4, or comprise wool, felt, microfiber or any other soft material on their bottom surface, which is adapted for polishing a vehicle, boat or aircraft body. Sanding pads comprise an abrasive material on their bottom surface for sanding wood, metal, plastic, varnish, lacquer, putty or body filler, or any other material. The polishing pads 2 as well as the sanding pads usually have a layer 6 of a hook-and-loop fastener attached to their top surface, adapted for releasable connection to the bottom surface of a backing or support plate. Another layer of a hook-and-loop fastener is attached to the bottom surface of the backing or support plate. Hereinafter it is referred to polishing pads 2 merely by example. The following description applies to any type or kind of circular plate-like accessories for power tools.

Figure 5:
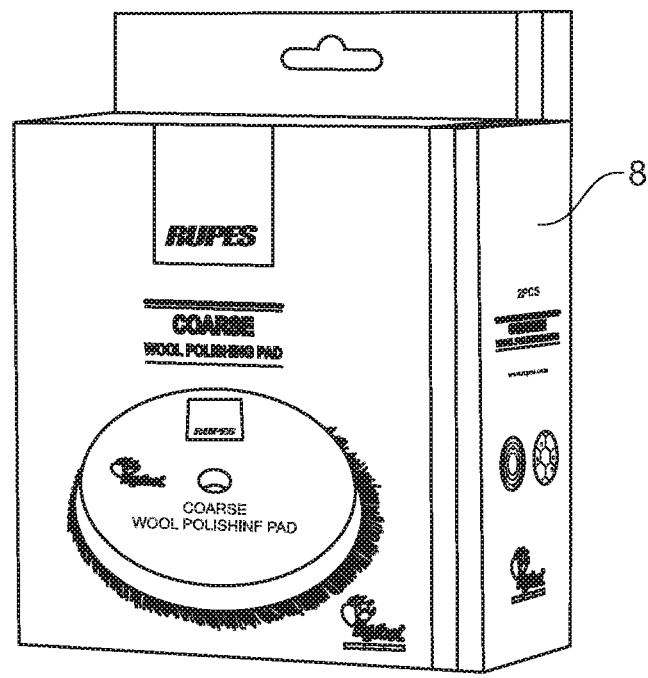
FIG. 5 a conventional package unit comprising a cardboard box and polishing pads contained therein.
Figure 6:
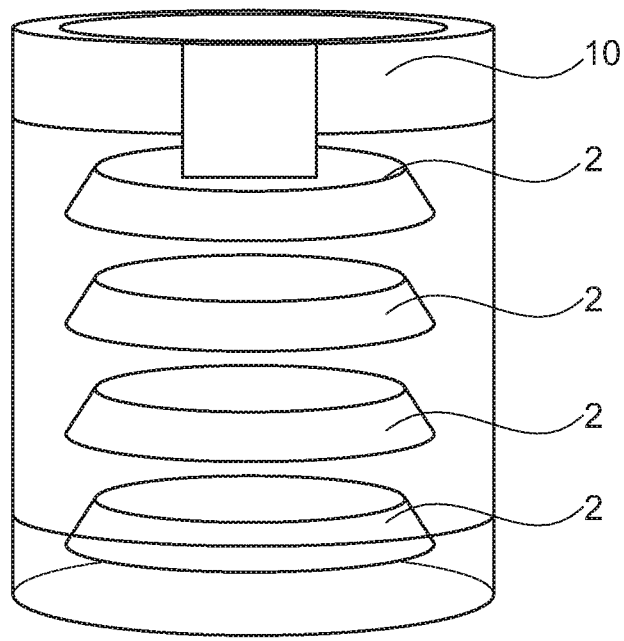
FIG. 6 a conventional package unit comprising a tubular transparent plastic box and polishing pads stacked therein.

It is known to pack circular plate-like accessories for hand guided power tools, for example polishing pads 2, in tubular or rectangular plastic or cardboard boxes. FIG. 5 shows a known packaging 8 in the form of a rectangular cardboard box containing a plurality (a bundle) of polishing pads 2 (not visible in FIG. 5). FIG. 6 shows a known tubular transparent rigid plastic packaging 10 for polishing pads 2 (barely visible in FIG. 6) stacked above each other inside the packaging 10.

The disadvantage of the known packaging for circular plate-like accessories 2 for hand guided power tools is that the accessories are exposed to external influences such as UV-radiation, humidity, dust and debris (if the packaging has holes or cannot be tightly closed), or chemicals, in particular acid or lye. This may cause a degradation of the materials which the accessories are made of, in particular due UV-radiation, humidity or chemicals coming into contact with or affecting the accessories. This severely reduces lifetime of the accessories. Further, the external appearance of the accessories may suffer due to discoloring, in particular caused by UV-radiation and the deposition of dust and debris. This severely reduces acceptance of the accessories by clients when considering a purchase of the accessories. Finally, the accessories are not securely protected from external forces which may act on the packaging and the accessories stored therein, for example during storage and transport of the package unit. This may lead to permanent deformation of the packaging and/or the accessories, in particular if high temperatures and/or humidity are involved. For example, it is not at all unusual that during transport of the package units, temperatures of 50° C. to 80° C. are measured inside the cargo area of trucks, trains or ships. This does not only reduce acceptance of the accessories by clients when considering a purchase of the accessories but also affect proper functioning of the accessories during their intended use.

Figure 1:
FIG. 1 a packaging of a package unit according to a first embodiment of the present invention in a top view.
Figure 2:
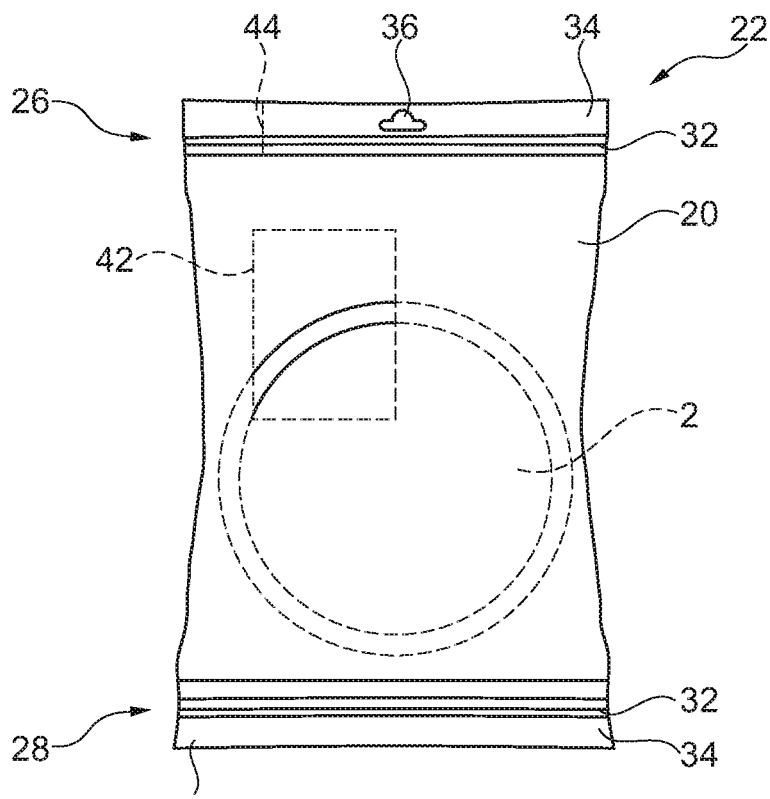
FIG. 2 a packaging of a package unit according to a second embodiment of the present invention in a top view.

The present invention overcomes the above drawbacks. It provides a unique and particularly advantageous packaging of circular plate-like accessories for hand guided power tools, in particular polishers or sanders. An example of the packaging 20 according to the invention is shown in FIG. 1. An example of the entire package unit 22, comprising the packaging 20 and a polishing pad 2 contained therein, is shown in FIG. 2.

It is suggested that the packaging 20 is a flow pack containing only a single polishing pad 2, sanding pad, backing or supporting plate or similar circular plate-like accessory for power tools.

Figure 3:
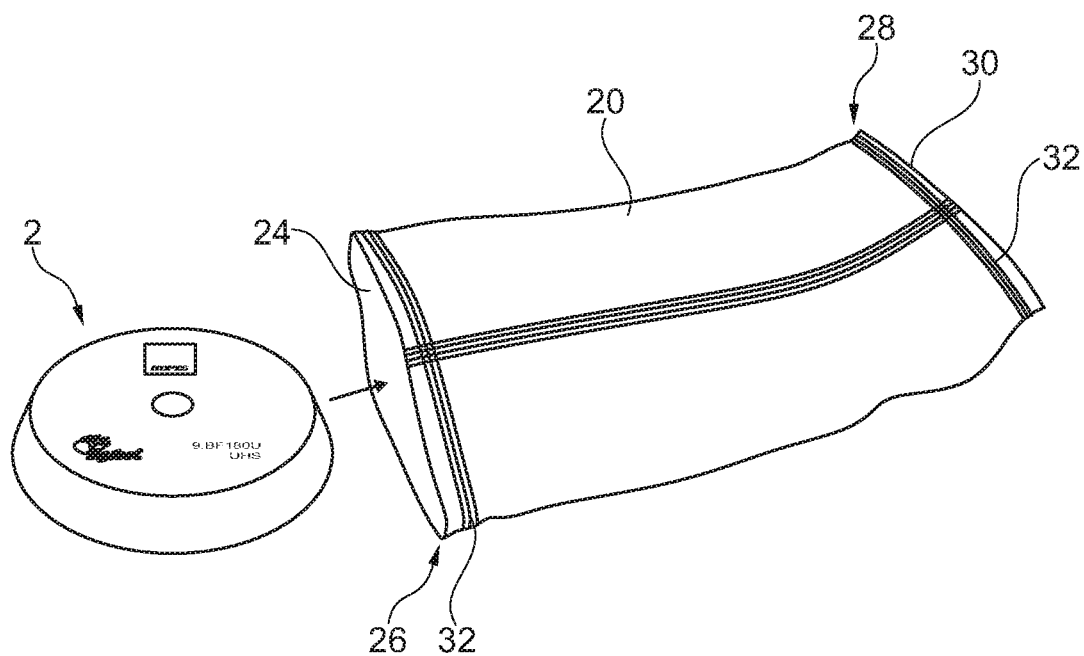
FIG. 3 a package unit according to a third embodiment of the present invention in a perspective view, comprising a packaging and a polishing pad.

The material used for the flow packs 20 is rather inexpensive, very light-weight, can be easily handled and recycled by 100%. Further, the polishing pad 2 can be packed in the flow packs 20 in a fast, cost-efficient and fully automated manner, e.g. by means of a fully automated packing machine, in particular a so-called flow wrapping machine. The production of the flow packs 20 and the process of packaging the polishing pads 2 can be performed by a single machine or by separate machines. The starting point is a layer of a material which is brought into a tubular form by folding the lateral sides of the material web together and sealing them. The material layer is either rolled up on a roll or folded into a stack or pile in web form. The material web is taken from the roll or stack, brought into the tubular form and the polishing pad 2 is inserted therein through an opening 24 at the front side 26 of the opened tubular material (see FIG. 3). An opposite back side 28 may already be sealed when the polishing pad 2 is inserted or may be sealed later together with the front side 26. After insertion of the polishing pad 2, the front side 26 or both sides 26, 28 of the tubular material is sealed. Thus, the polishing pad 2 is enclosed by the tubular material and the sealed front and back sides 26, 28. The polishing pad 2 is preferably packed in the packaging 20 in an airtight manner. By sealing the front side 26 of the tubular web, the opening 24 is permanently closed. Thus, the flow pack 20 can only be opened by tearing the material of the flow pack 20 and/or by releasing the sealing seam at the front or back side 26, 28. Simultaneously with or after sealing the back side 28 of the tubular material web, it can be cut along a cutting edge 30 to the desired length to form a single flow pack 20 with the accessory 2 packed therein.

Hence, it is suggested that the flow pack 20 comprises a tubular bag whose opposite originally open sides 26, 28 are permanently sealed in an airtight manner after insertion of the polishing pad 2 into the bag. Preferably, the opposite open sides 26, 28 of the tubular bag are permanently sealed by means of heat sealing, gluing or welding. Of course, any other procedure for sealing the open sides of the tubular bag, which permit an airtight sealing of the tubular bag, can be used, too.

The sealing seams are indicated in the figures with reference sign 32. They are located in a distance to the cutting edges 30 at the front and back sides 26, 28, leaving flaps 34 between the sealing seams 32 and the cutting edges 30. The preferably extend parallel to the cutting edges 30. Each side 26, 28 of the flow pack 20 may have one or more sealing seams 32. A plurality of sealing seams 32 on one side 26; 28 preferably extend parallel to each other. The sealing seams 32 could also have a zig-zag, saw tooth or a meandering form.

The flap 34 at the front side 26 of the flow pack 20 may have a larger linear extension than the flay 34 at the back side 28. The flap 34 at the front side 26 is preferably provided with a suspension device, e.g. a hole 36, for hanging the flow pack 20 on a stand, hook or the like, e.g. for sale in a sales room or for temporary storage in a workshop.

Preferably, the material of the flow pack 20 is flexible and resistant against water, chemicals and/or UV-rays. Thus, the flow pack 20 constitutes a barrier against humidity, chemicals and/or UV-rays and protects the polishing pad 2 contained in the flow pack 20 from these external influences. The material of the flow pack 20 is a foil with a thickness of preferably <100 μm, in particular <50 μm, in average according to DIN 53370. Other preferred technical characteristics of the foil used for the flow pack 20 are a tensile strength in a longitudinal direction of the flow pack 20 of >100 N/mm$^2$ according to ISO 527-3 and a tensile strength in a transverse direction of the flow pack 20 of >120 N/mm$^2$ according to ISO 527-3.

It is suggested that the material of the flow pack 20 comprises at least one layer made of a plastic foil. Additionally or alternatively, the material of the flow pack may comprise at least one layer made of a metal foil. It is suggested that the material of the flow pack 20 comprises a composite laminated material with at least two layers made of different materials, the layers inseparably laminated to each other. The layers may be made of or comprise plastic, metal and/or any other foil material. Preferably, at least one of the layers is made of metal, in particular aluminium. Most preferably, it is suggested that at least one of the layers is made of plastic, in particular polyethylene terephthalate (PET), polyethylene (PE) or polypropylene (PP).

An external layer or an external surface of the flow pack 20 may have a desired colour 38 (black with white stripes 38.1, 38.2 in the example of FIG. 1) and/or may be provided with a desired imprint 40. The imprint 40 may be provided on the external layer or surface of the tubular material web, from which the flow pack 20 is produced, before it is rolled up on a roll or stacked on a pile. The imprint 40 may be provided by means of any known printing process, including but not limited to tampon printing, inkjet printing, and laser printing. In the embodiment of FIG. 1, the imprint 40 comprises a logo and/or a name 40.1 of a manufacturer of the polishing pad 2 ("RUPES"), a product name/description 40.2 of the polishing pad 2 ("D-A ULTRA-FINE—HIGH PERFORMANCE—ULTRA-FINE POLISHING FOAM PAD—Recommended for Dual Action Orbital Polishers"), a brand name 40.3 under which the polishing pad 2 is commercialized (paw-logo and "BigFoot"), technical information 40.4 about the polishing pad 2 (dimension of the polishing pad 2 in mm and inches) and/or a production notice 40.5 ("Made in Italy"). Of course, any other imprint 40 would be possible, too.

The colour 38 of the external layer or surface or of the imprint 40 of the flow pack 20 may be representative of the type of accessory contained in the respective packaging 20. For example, it is known that polishing pads 2 are available in different colours (e.g. blue, green, yellow, white) each corresponding to a specific hardness (e.g. coarse, medium, fine, ultra-fine). The colour 38 of the external layer or surface or of the imprint 40 of the flow pack 20 may be or may comprise, e.g. blue, green, yellow, white, depending on the hardness of the polishing pad 2 contained therein. In the present case, the white stripes 38.1, 38.2 at the front and back sides 26, 28 of the flow pack 20 represent an ultra-fine polishing pad 2 contained in the flow pack 20.

The material of the flow pack 20 may be transparent or opaque. If the material of the flow pack 20 is opaque or the flow pack 20 has an opaque coating, it is suggested that the flow pack 20 may further have a transparent window 42 that allows a view of the packaged polishing pad 2 (see FIG. 2). This has the advantage, that a potential client or user of the polishing pad 2 can immediately see what type of polishing pad 2 is contained in the flow pack 20. Preferably, the transparent window 42 is provided with a transparent UV-filter coating which blocks at least most if not all of external UV-rays and protects the polishing pad 2 inside the flow pack 20 from the UV-rays.

In order to provide for a safe and secure protection of the polishing pad 2 contained in the flow pack 20, it is suggested that the material of the flow pack 20 is tear-resistant. 'Tear resistance' in this context means that the material of the flow pack 20 cannot be easily torn by a user with his bare hands. The material will withstand a user grabbing the material with his hands and trying to tear it apart. However, the flow pack 20 may be opened by means of a pointed object, e.g. the tip of a knife or of a scissors, which may be stuck into the material for creating a hole starting from which the material may be torn open. Alternatively, the flow pack 20 could be opened by separating the layers of the flow pack 20 in the region of the sealing seams 32, i.e. by releasing the sealing seams 32. However, in that case not the material would be torn open but rather the sealing seams 32, where the layers are sealed together at the front and the back sides 26, 28 of the flow back 20, are broken up. The high tear resistance allows the realization of an air cushion damping effect without the danger of the flow pack 20 bursting apart when pressed together by external force.

As previously mentioned, the flow pack 20 preferably has two transverse airtight sealing seams 32 at opposite sides 26, 28 of the flow pack 20. In order to facilitate opening of the flow pack 20 by a user, it is suggested that the flow pack 20 comprises at least one longitudinal tearing region 44 positioned in at least one of the flaps 34. The longitudinal tearing region 40 may comprise a perforation or a slit. It extends through the flap(s) 34 into the transverse airtight sealing seam(s) 32. Preferably, the tearing region 44 does not extend beyond the sealing seams 32 into that part of the material which covers the polishing pad 2 contained in the flow pack 20. This assures a safe and reliable airtight encapsulation of the accessory 2. Of course, it would also be possible that the tearing region 44 has a transverse extension instead of the shown longitudinal extension. Furthermore, it would also be possible that the tearing region 44 extends entirely in the flap 34 and does not reach the sealing seam 32.

Furthermore, it is suggested that the flow pack 20 has a gas enclosed therein after the opposite sides 26, 28 of the flow pack 20 have been permanently sealed in an airtight manner. The gas may be ambient air which provides the polishing pad 2 with an air-cushion damping effect during transport and handling of the package unit 22.

Alternatively, the gas may be a specific packaging gas, which is introduced into the flow pack 20 in order to flush ambient air out of the flow pack 20 before permanently sealing the opposite sides 26, 28 of the flow pack 20 in an airtight manner and in order to protect the integrity of the packaged polishing pad 2. A packaging gas is used to pack sensitive goods in a modified atmosphere environment. A protective atmosphere may prevail inside the flow pack 20 due to the packaging gas it contains. The gas used is usually inert, or of any other nature that protects the integrity of the packaged accessory 2, inhibiting unwanted chemical reactions such as oxidation. The packing gas may in particular comprise one or more of the following gases or a mixture of two or more of these or other gases:

argon (E938),
helium (E939),
nitrogen (E941), and
carbon dioxide (E290).
Preferably, the packing gas is a $CO_2$-nitrogen mixture.

The invention claimed is:

1. Package unit (22) comprising a packaging (20) and a single polishing pad (2) contained in the packaging (20) and adapted for use with hand-guided polishers, wherein
the packaging (20) is a flow pack,
a material of the flow pack (20) is opaque or the flow pack (20) has an opaque coating,
the package unit (22) is manufactured from a material layer, which is either rolled up on a roll or folded into a stack or pile in web form, brought into a tubular form by folding lateral sides of the material layer together and sealing them, inserting the polishing pad (2) therein and permanently sealing a front side (26) and an opposite back side (28) of the tubular form in order to form two transverse airtight sealing seams (32), and
the flow pack (20) has a gas enclosed therein after the front side (26) and the opposite back side (28) of the flow pack (20) have been permanently sealed in an airtight manner, the enclosed gas having a larger volume than the polishing pad (2) contained in the flow pack (20), and the gas providing the polishing pad (2) with an air-cushion damping effect during transport and handling of the package unit (22).

2. Package unit (22) according to claim 1, wherein the front side (26) and the opposite back side (28) are permanently sealed by means of heat sealing, gluing or welding.

3. Package unit (22) according to claim 1, wherein the material of the flow pack (20) comprises at least one layer made of a plastic foil, including the plastic foil being made of polyethylene terephthalate (PET), polypropylene (PP) or polyethylene (PE) foil.

4. Package unit (22) according to claim 1, wherein the material of the flow pack (20) comprises at least one layer made of a metal foil, including the metal foil being made of aluminium.

5. Package unit (22) according to claim 1, wherein the material of the flow pack (20) comprises a composite laminated material with at least two layers made of different materials, the at least two layers inseparably laminated to each other.

6. Package unit (22) according to claim 1, wherein the material of the flow pack (20) is tear-resistant.

7. Package unit (22) according to claim 1, wherein the flow pack (20) has at least one tearing region (44) positioned near at least one of the two transverse airtight sealing seams (32).

8. Package unit (22) according to claim 7, wherein the at least one tearing region (44) comprises a perforation or a slit.

9. Package unit (22) according to claim 1, wherein the gas is a specific packaging gas, which is introduced into the flow pack (20) in order to flush ambient air out of the flow pack (20) before permanently sealing the front side (26) and the opposite back side (28) of the flow pack (20) in an airtight manner and in order to protect the integrity of the single polishing pad (2).

10. Package unit (22) according to claim 1, wherein the flow pack (20) has a transparent window (42) that allows a view of the single polishing pad (2).

* * * * *